(12) United States Patent
Tokushige et al.

(10) Patent No.: US 9,975,447 B2
(45) Date of Patent: May 22, 2018

(54) TEMPERATURE CONTROL APPARATUS FOR ELECTRICITY STORAGE DEVICE FOR USE IN ELECTRICITY STORAGE SYSTEM INCLUDING ELECTRICITY STORAGE DEVICES

(71) Applicant: KAWASAKI JUKOGYO KABUSHIKI KAISHA, Kobe-shi, Hyogo (JP)

(72) Inventors: Takayuki Tokushige, Kobe (JP); Masato Hayashi, Kobe (JP); Mikihiko Kataoka, Kobe (JP); Soichiro Bando, Kakogawa (JP); Tatsuya Ohno, Nishinomiya (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 148 days.

(21) Appl. No.: 15/108,181

(22) PCT Filed: Dec. 26, 2014

(86) PCT No.: PCT/JP2014/084559
§ 371 (c)(1),
(2) Date: Jun. 24, 2016

(87) PCT Pub. No.: WO2015/099138
PCT Pub. Date: Jul. 2, 2015

(65) Prior Publication Data
US 2016/0318418 A1 Nov. 3, 2016

(30) Foreign Application Priority Data

Dec. 26, 2013 (JP) .................................. 2013-269206

(51) Int. Cl.
*H02J 7/00* (2006.01)
*H02J 7/14* (2006.01)
(Continued)

(52) U.S. Cl.
CPC ............. *B60L 11/1872* (2013.01); *B60L 1/20* (2013.01); *B60L 3/12* (2013.01); *B60L 11/005* (2013.01);
(Continued)

(58) Field of Classification Search
USPC .................................................. 320/132, 150
See application file for complete search history.

(56) References Cited

U.S. PATENT DOCUMENTS 6,075,328 A * 6/2000 Notohara ............... H02M 5/458
318/400.01
2009/0314558 A1* 12/2009 Ang ........................ B60K 6/26
180/65.1
(Continued)

FOREIGN PATENT DOCUMENTS

JP 2000-092614 A 3/2000
JP 2008-109756 A 5/2008
(Continued)

OTHER PUBLICATIONS

Feb. 3, 2015 International Search Report issued in International Patent Application No. PCT/JP2014/084559.

*Primary Examiner* — Samuel Berhanu
(74) *Attorney, Agent, or Firm* — Oliff PLC

(57) ABSTRACT

In a power storage system, a bidirectional DC-DC converter is set into mode for charging a secondary battery with electricity when a first state of charge (SOC) of the secondary battery is larger than a minimum value of the first SOC, and a second SOC of the capacitor is smaller than a maximum value of the second SOC, and the converter is set into mode for discharging electricity from the secondary battery when the first SOC is smaller than a maximum value of the first SOC, and the second SOC is larger than a minimum value of the second SOC. Based on an internal resistance of the secondary battery, the second SOC, a
(Continued)

voltage of a direct current link in case of no load connected to DC link, and an error in a current on a direct current link side, a conduction ratio (D) of the converter is calculated.

6 Claims, 7 Drawing Sheets

(51) Int. Cl.
    *B60L 11/18* (2006.01)
    *H01M 10/625* (2014.01)
    *H01M 10/615* (2014.01)
    *H01M 10/637* (2014.01)
    *H01M 10/633* (2014.01)
    *B60L 3/12* (2006.01)
    *B60L 11/00* (2006.01)
    *H01M 10/48* (2006.01)
    *B60L 1/00* (2006.01)
    *H01M 10/44* (2006.01)
    *H01M 10/0525* (2010.01)

(52) U.S. Cl.
CPC ....... *B60L 11/1803* (2013.01); *B60L 11/1862* (2013.01); *B60L 11/1875* (2013.01); *H01M 10/443* (2013.01); *H01M 10/486* (2013.01); *H01M 10/615* (2015.04); *H01M 10/625* (2015.04); *H01M 10/633* (2015.04); *H01M 10/637* (2015.04); *H02J 7/007* (2013.01); *H02J 7/0021* (2013.01); *H02J 7/0091* (2013.01); *B60L 2200/32* (2013.01); *B60L 2210/10* (2013.01); *B60L 2210/12* (2013.01); *B60L 2210/14* (2013.01); *B60L 2210/42* (2013.01); *B60L 2240/545* (2013.01); *H01M 10/0525* (2013.01); *H02J 7/0054* (2013.01); *Y02E 60/122* (2013.01); *Y02T 10/705* (2013.01); *Y02T 10/7011* (2013.01); *Y02T 10/7016* (2013.01); *Y02T 10/7022* (2013.01); *Y02T 10/7044* (2013.01); *Y02T 10/7216* (2013.01); *Y02T 10/7225* (2013.01); *Y02T 10/7233* (2013.01); *Y02T 10/92* (2013.01)

(56) References Cited

U.S. PATENT DOCUMENTS

| | | | | |
|---|---|---|---|---|
| 2010/0001583 | A1* | 1/2010 | Ichikawa | B60L 3/0046 307/10.1 |
| 2010/0085019 | A1* | 4/2010 | Masuda | H02J 7/1453 320/152 |
| 2010/0207587 | A1* | 8/2010 | Oyobe | B60K 6/20 320/152 |
| 2015/0069963 | A1* | 3/2015 | Ichikawa | B60L 1/02 320/108 |

FOREIGN PATENT DOCUMENTS

| | | |
|---|---|---|
| JP | 2010-093871 A | 4/2010 |
| JP | 2013-149471 A | 8/2013 |

\* cited by examiner

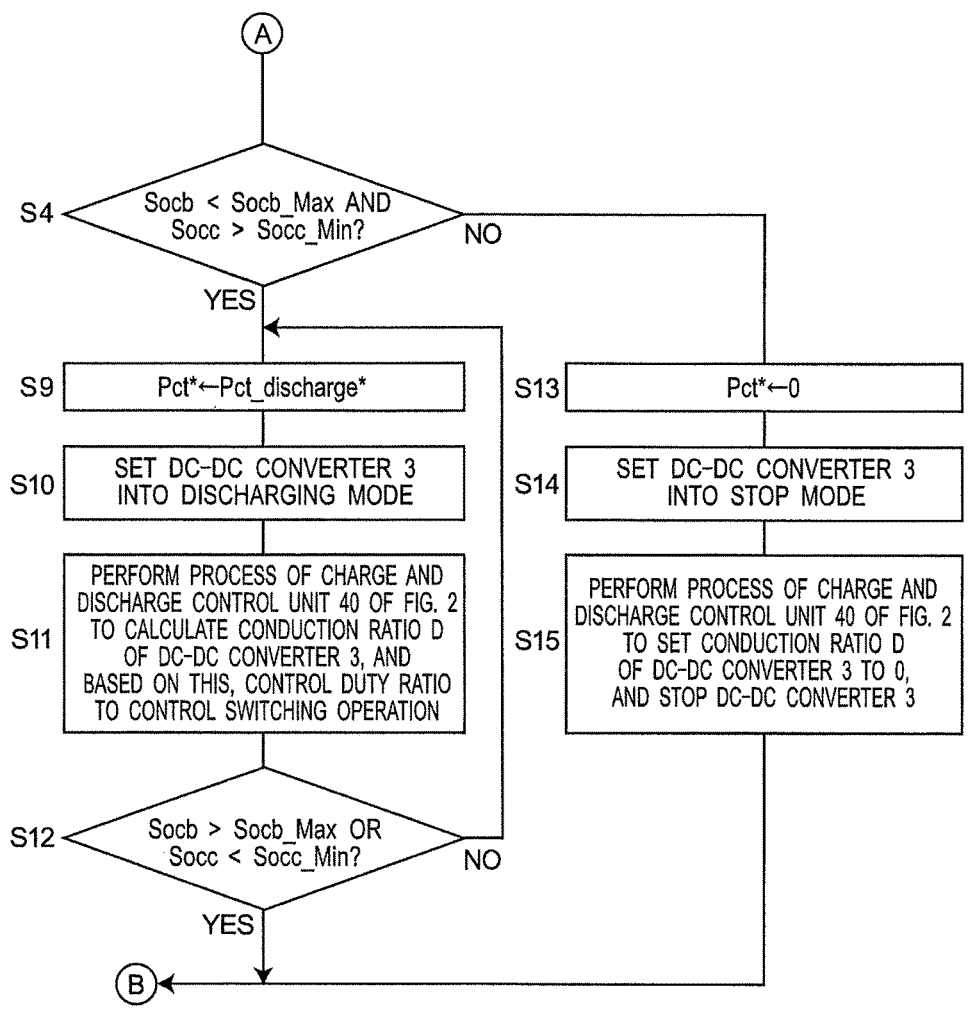

TEMPERATURE CONTROL APPARATUS FOR ELECTRICITY STORAGE DEVICE FOR USE IN ELECTRICITY STORAGE SYSTEM INCLUDING ELECTRICITY STORAGE DEVICES

The present invention relates to a temperature control apparatus and method for an electricity storage device, which are used for an electricity storage system including a plurality of electricity storage devices, and to an electricity storage system using the temperature control apparatus.

BACKGROUND ART

There are some electricity storage devices whose internal resistances increase and thus charging and discharging capacities are lowered, with decreasing temperatures of the electricity storage devices. For example, as for the internal resistance with respect to a battery temperature of a typical lithium (Li) ion battery, the internal resistance when the battery is used at 10° C. is about 2.5 times greater than the internal resistance when the battery is used under an optimum temperature condition (25° C.). For this reason, when charging or discharging is performed at low temperatures, such a problem occurs that a voltage greatly decreases or increases to fall outside an operable battery voltage range, inhibiting a battery from outputting a desired amount of charging or discharging electricity. Two solutions to the problem with an inability to output a desired amount of charging or discharging electricity at low temperatures are as follows.

The first solution is a method of setting a temperature of an electricity storage device to a preset temperature by warming up a neighborhood of the electricity storage device. For example, Chevrolet Volt plug-in hybrid vehicles are equipped with a refrigerant circuit for a battery. This refrigerant circuit functions to not only cool down the battery, but also heat the battery when an operation temperature decreases below an optimum range.

In addition, the second solution disclosed in Patent Document 1 is a method of forcibly performing charging or discharging within a predetermined charging range of an electricity storage device. In this second solution, heat generating as a result of the charging or discharging is used to control a temperature of the battery so as to become a preset temperature. When a temperature of the battery is lower than the preset temperature, charging or discharging is forcibly performed to feed current to the battery, and this leads to generation of heat from the internal resistance of the battery.

PRIOR ART DOCUMENT

Patent Document

[Patent Document 1] Japanese Patent Laid-open Publication No. JP2000-092614A

SUMMARY OF THE INVENTION

Problems to be Solved by the Invention

In the first solution, even when a vehicle is not moving, a controller still controls the refrigerant circuit. However, since the controller sets a temperature of the battery to a preset temperature by warming up the neighborhood of the battery, it may be impossible to promptly and easily increase a temperature of the battery to the preset temperature. In addition, the need for electricity supplied to the refrigerant circuit may turn out to be problematic.

In the second solution, since the interior of the battery can be warmed up, it is possible to promptly increase a temperature of the battery to a preset temperature. However, there is such a problem that applying a load (engine output request) causes electricity stored in the battery to be consumed in vain.

An object of the present invention is to address the above problems, and is to provide: a temperature control apparatus and method for an electricity storage device which are used for an electricity storage system using a plurality of electricity storage devices in combination, the apparatus and method capable of greatly decreasing power consumption in comparison with the prior art; and an electricity storage system using the temperature control apparatus.

Means for Solving the Problems

According to a first aspect of the present invention, there is provided a temperature control apparatus for an electricity storage device for use in an electricity storage system including a plurality of electricity storage devices including a first electricity storage device and a second electricity storage device. The first electricity storage device has a predetermined internal resistance. The temperature control apparatus includes a bidirectional DC-DC converter, temperature measurement means, and controller means. The bidirectional DC-DC converter is provided between the first electricity storage device and the second electricity storage device, so that the first electricity storage device is connected in parallel to the second electricity storage device through the bidirectional DC-DC converter and a DC link. The temperature measurement means is configured to measure a temperature of the first electricity storage device, and controller means is configured to control the temperature of the first electricity storage device. The controller means calculates a first SOC (State of Charge; referred to as SOC hereinafter) of the first electricity storage device, based on a voltage or a current of the first electricity storage device, and the controller means calculates a second SOC of the second electricity storage device, based on a voltage or a current of the second electricity storage device. When the first SOC is larger than a predetermined minimum value of the first SOC and the second SOC is smaller than a predetermined maximum value of the second SOC, the controller means sets the bidirectional DC-DC converter into a charging mode from the second electricity storage device to the first electricity storage device and controls the bidirectional DC-DC converter to operate in the charging mode. When the first SOC is smaller than a predetermined maximum value of the first SOC and the second SOC is larger than a predetermined minimum value of the second SOC, the controller means sets the bidirectional DC-DC converter into a discharging mode from the first electricity storage device to the second electricity storage device and controls the bidirectional DC-DC converter to operate in the discharging mode. The controller means calculates a conduction ratio D of the bidirectional DC-DC converter, based on the internal resistance of the first electricity storage device, the second SOC and a voltage on the DC link which are obtained when no load is connected to the DC link, and an error in a current of the bidirectional DC-DC converter on a DC link side, and then, the controller means controls the bidirectional DC-DC converter so that a conduction ratio of the bidirectional DC-DC converter becomes the conduction ratio D, thereby controlling the temperature of the first electricity storage device by using heat generating from the internal resistance of the first electricity storage device.

Further, in the above-mentioned temperature control apparatus for the electricity storage device, the controller means calculates a first output power instruction value for the second electricity storage device, based on the internal resistance of the first electricity storage device and the second SOC which are obtained when no load is connected to the DC link, calculates a current instruction value for the bidirectional DC-DC converter on the DC link side, from the first output power instruction value and the voltage on the DC link, and calculates the conduction ratio D of the bidirectional DC-DC converter, based on the error between the current instruction value and the current of the bidirectional DC-DC converter on the DC link side.

Furthermore, in the above-mentioned temperature control apparatus for the electricity storage device, the controller means calculates a second output power instruction value for the second electricity storage device in accordance with a load connected to the DC link, and then, controls the bidirectional DC-DC converter by adding the second output power instruction value to the first output power instruction value.

According to a second aspect of the present invention, there is provided an electricity storage system including the temperature control apparatus for the electricity storage device for use in the electricity storage system, and a plurality of electricity storage devices including the first electricity storage device and the second electricity storage device.

In the electricity storage system, the electricity storage system further includes a DC-AC inverter configured to convert a voltage on the DC link into an AC voltage.

According to a third aspect of the present invention, there is provided a temperature control method for use in an electricity storage system including a plurality of electricity storage devices including a first electricity storage device and a second electricity storage device. The first electricity storage device has a predetermined internal resistance, and the method is performed by a temperature control apparatus for the electricity storage devices. The temperature control apparatus includes a bidirectional DC-DC converter, temperature measurement means, and controller means. The bidirectional DC-DC converter is provided between the first electricity storage device and the second electricity storage device, so that the first electricity storage device is connected in parallel to the second electricity storage device through the bidirectional DC-DC converter and a DC link. The temperature measurement means is configured to measure a temperature of the first electricity storage device, and the controller means is configured to control a temperature of the first electricity storage device. The temperature control method includes the following steps, which is performed by the controller means, of:

calculating a first SOC of the first electricity storage device, based on a voltage or a current of the first electricity storage device;

calculating a second SOC of the second electricity storage device, based on a voltage or a current of the second electricity storage device;

when the first SOC is larger than a predetermined minimum value of the first SOC and the second SOC is smaller than a predetermined maximum value of the second SOC, setting the bidirectional DC-DC converter into a charging mode from the second electricity storage device to the first electricity storage device and controlling the bidirectional DC-DC converter to operate in the charging mode, when the first SOC is smaller than a predetermined maximum value of the first SOC and the second SOC is larger than a predetermined minimum value of the second SOC, setting the bidirectional DC-DC converter into a discharging mode from the first electricity storage device to the second electricity storage device and controlling the bidirectional DC-DC converter to operate in the discharging mode; and calculating a conduction ratio D of the bidirectional DC-DC converter, based on the internal resistance of the first electricity storage device, the second SOC, a voltage on the DC link which are obtained when no load is connected to the DC link, and an error in a current of the bidirectional DC-DC converter on a DC link side, and then, controlling the bidirectional DC-DC converter so that a conduction ratio of the bidirectional DC-DC converter becomes the conduction ratio D, thereby controlling the temperature of the first electricity storage device in accordance with a variation in the internal resistance of the first electricity storage device.

Effect of the Invention

According to the present invention, a temperature control apparatus and method for an electricity storage device which are used for an electricity storage system using a plurality of electricity storage devices in combination control charging and discharging between these electricity storage devices, thus promptly and easily increasing an temperature of each of the electricity storage devices to a preset temperature and not consuming electricity in vain during an increase in the temperature. Therefore, it is possible to greatly decrease the power consumption in comparison with the prior art.

BRIEF DESCRIPTION OF THE DRAWINGS

FIG. 3B is a flowchart representing a second part of the process of controlling a temperature of the electricity storage device, the process being performed by the controller 10 of FIG. 1.

MODE FOR CARRYING OUT THE INVENTION

Figure 1:
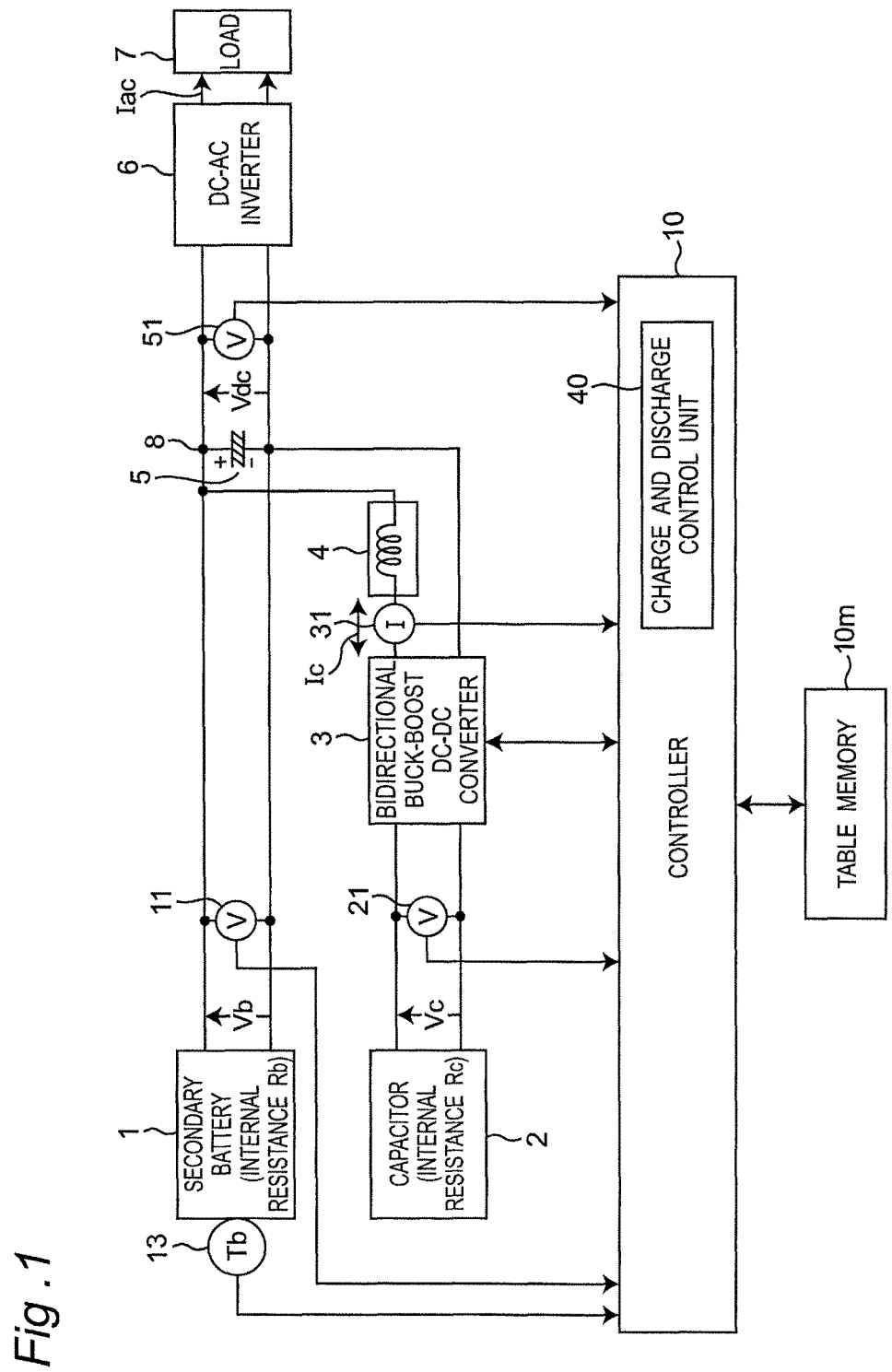
FIG. 1 is a block diagram illustrating a configuration of an electricity storage system according to an embodiment of the present invention.

Some embodiments of the present invention will be described below with reference to the accompanying drawings. It should be noted that in the following embodiments, the same reference characters are given to similar constituent elements.

FIG. 1 is a block diagram illustrating a configuration of an electricity storage system according to an embodiment of the present invention. The electricity storage system of FIG. 1 includes: a secondary battery 1 having an internal resistance Rb such as a lithium ion battery; a capacitor 2 having an internal resistance Rc such as a lithium ion capacitor; a bidirectional buck-boost DC-DC converter (referred to as a DC-DC converter hereinafter) 3; a smoothing reactor (referred to as a reactor hereinafter) 4; a filter capacitor 5; a DC-AC inverter 6; and a load 7. In this case, the secondary battery 1 is constituted by connecting an Nb number of cells in series to form an Mb number of series circuits and connecting the series circuits in parallel. The capacitor 2 is constituted by connecting an Nc number of cells in series to form an Mc number of series circuits and connecting the series circuits in parallel. The secondary battery 1 is connected in parallel to the capacitor 2 on a DC link 8 through the DC-DC converter 3 and the reactor 4. The DC-DC converter 3 has a charging mode of charging the capacitor 2 with electricity and a discharging mode of discharging electricity from the capacitor 2. The DC-DC converter 3 makes a bidirectional DC-DC conversion between the capacitor 2 and the DC link 8, and can change individual DC voltages by boosting or bucking the DC voltages. These operations are controlled by the controller 10. A DC voltage on the DC link 8 is DC-to-AC-converted into an AC voltage by the DC-AC inverter 6, and the AC voltage is outputted to the AC load 7.

Referring to FIG. 1, a voltage detector 11 is provided in the secondary battery 1 in order to measure a voltage Vb of the secondary battery 1, and a temperature measurement instrument 13 is provided in order to measure a battery temperature Tb of the secondary battery 1. In addition, a voltage detector 21 is provided in the capacitor 2 in order to measure a voltage Vc of the capacitor 2. Further, a current detector 31 is provided in order to measure a current of the reactor 4. A voltage detector 51 is provided in order to measure a voltage Vdc on the DC link 8. Information regarding voltages measured by the voltage detectors 11, 21, and 51 and a current measured by the current detector 31 is outputted to the controller 10. The controller 10 is based on the input information and has a charge and discharge control unit 40 of FIG. 2 and a table memory 10m. The table memory 10m stores individual voltage tables (tables showing relationships between voltages and SOCs), which are used to estimate and calculate a SOC of the secondary battery 1 and a SOC of the capacitor 2, for example, in a voltage table method. The controller 10 controls an operation mode of the DC-DC converter 3 and a conduction ratio D of the DC-DC converter 3 by performing processes of controlling a temperature of an electricity storage device of FIGS. 3A and 3B, thus controlling a temperature of the secondary battery 1. In this case, a duty ratio of the DC-DC converter 3 is determined based on the conduction ratio D.

Figure 2:
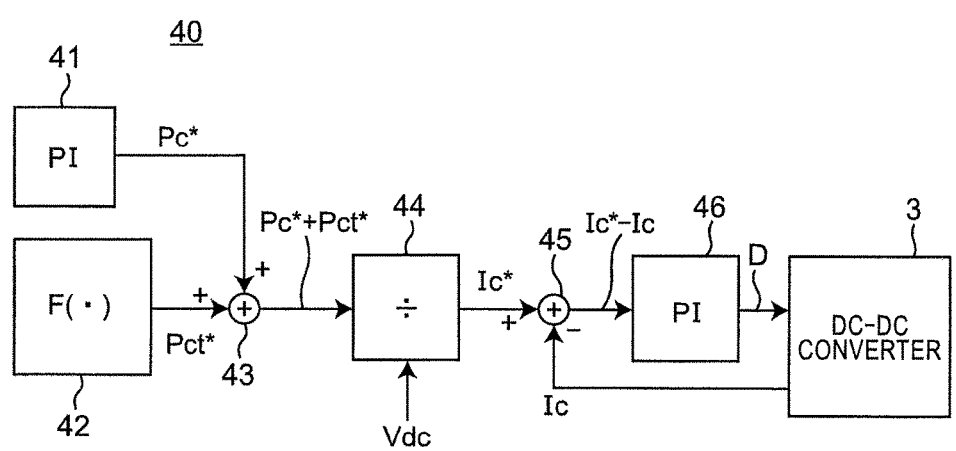
FIG. 2 is a flow diagram illustrating a control flow of a charge and discharge control unit 40 in a controller 10 of FIG. 1.

FIG. 2 is a flow diagram illustrating a control flow of the charge and discharge control unit 40 in the controller 10 of FIG. 1. Referring to FIG. 2, the charge and discharge control unit 40 includes PI (proportional integral) controllers 41 and 46, a control function value output unit 42, an adder 43, a divider 44, and a subtractor 45. The PI controller 41 generates an output power instruction value Pc* (kW) for the capacitor 2 in accordance with the load 7 and outputs the output power instruction value Pc* to the adder 43. In addition, the control function value output unit 42 calculates a function value Pct* (kW) of a temperature control function F (•) for the secondary battery 1, which will be described in detail below, and outputs the function value Pct* (kW) to the adder 43. The adder 43 adds up the two input values and outputs an added result, that is, an instruction value (Pc*+Pct*), to the divider 44. The divider 44 divides the input instruction value (Pc*+Pct*) by the voltage Vdc on the DC link 8 and outputs a divided result, that is, a primary-side current instruction value Ic* (A) for the capacitor 2, to the subtractor 45. The subtractor 45 subtracts a capacitor primary-side current value Ic (A) measured by the current detector 31 from the primary-side current instruction value Ic* for the capacitor 2 and outputs a subtracted result, that is, an error value (Ic*−Ic), to the PI controller 46. The PI controller 46 controls a duty factor D of the DC-DC converter 3 based on the error value (Ic*−Ic) so that the error value (Ic*−Ic) becomes 0. It should be noted that the primary-side current Ic of the capacitor 2 is a current on the reactor 4 and DC link 8 side and measured by the current detector 31.

In order to deal with a load current Iac on an AC side, basically, the charge and discharge control unit 40 of FIG. 2 configured above is provided with: the PI controller 41 that uses the output power instruction value Pc* for the capacitor 2 depending on the load 7 as a controlled amount; and the PI controller 46 that uses the conduction ratio D of the DC-DC converter 3 depending on the primary-side current instruction value Ic* for the capacitor 2 as a controlled amount. Furthermore, the adder 43 adds an output power instruction value Pct* determined by the temperature control of the secondary battery 1 to the output power instruction value Pc* for the capacitor 2 depending on the load current Iac. In the present embodiment, basically, the DC-DC converter 3 controls the primary-side current Ic of the capacitor 2 in accordance with the load current Iac on the AC side, indirectly controlling a current Ib of the secondary battery 1. The DC-DC converter 3 controls the voltage Vdc on the DC link 8 so as to become the same as the voltage Vb of the secondary battery 1.

Next, a description will be given below of a basic logic of temperature control of a secondary battery.

(1) If the load 7 on the AC side is absent, the control function value output unit 42 uses the temperature control function F (•) of the secondary battery 1 to generate an output power instruction value Pct* for the capacitor 2 from, for example, an internal resistance Rb and a SOC of the capacitor 2 which are calculated based on a battery temperature (measurement value) Tb of the secondary battery 1.

(2) The divider 44 uses the output power instruction value Pct* and a DC link voltage Vdc to determine a primary-side capacitor current instruction value Ic* for the DC-DC converter 3. Then, the PI controller 46 determines a conduction ratio D of the DC-DC converter 3 as an output of the controller 10. As a result, a primary-side capacitor current Ic flows through the DC-DC converter 3. Since the load 7 on the AC side is absent, a current flows between the capacitor 2 and the secondary battery 1, causing charging and discharging. Heat generating in the internal resistance Rb in the secondary battery 1 increases a temperature of the secondary battery 1.

(3) If the load 7 occurs during an increase in the temperature, the charge and discharge control unit 40 stops the charging and discharging for increasing the temperature. Then, the PI controller 41 that outputs an output power instruction value Pc* controls the same by tracking with bumpless so as to be able to supply electricity to the load 7.

Subsequently, the temperature control function F (•) for the secondary battery 1 will be described below. Repeated charging and discharging between the secondary battery 1 and the capacitor 2 in order to increase the temperature is based on the temperature control function F (•).

First of all, the preconditions are as follows.

(1) A charge and discharge range of the secondary battery 1 is set to a range from a minimum value Socb_Min of a SOC to a maximum value Socb_Max (%) thereof. Typically, if a lifetime of the secondary battery 1 is taken into consideration, the secondary battery 1 preferably has a shallow depth of charge and discharge, which is in a range of approximately 10%.

(2) A charge and discharge range of the capacitor 2 is set to a range from a minimum value Socc_Min of a SOC to a maximum value Socc_Max (%) thereof. Typically, the capacitor 2 can have a great depth of charge and discharge.

(3) The internal resistance Rc of the capacitor 2 is set to a constant value Rc (Ω), because the internal resistance Rc does not largely depend on a temperature of the capacitor 2.

(4) An allowable range of a terminal voltage of the secondary battery 1 is set to a range from a minimum value Vb_Min to a maximum value Vb_Max (V).

(5) An allowable range of a terminal voltage of the capacitor 2 is set to a range from a minimum value Vc_Min to a maximum value Vc_Max (V).

Then, electrical characteristics of the secondary battery 1 prepared herein are as follows.

(1) Charging and discharging characteristics (Socb (%)–internal electromotive force Eb (V)): Eb=func1 (Socb); and (2) Temperature characteristics (battery temperature (measurement value) Tb (° C.)–internal resistance Rb (Ω)): Rb=func2 (Tb).

In this case, measurement values (including estimated, calculated values) are as follows.

(1) A battery temperature Tb (° C.) of the secondary battery 1: it is measured by the temperature measurement instrument 13.

(2) A voltage Vb (V) of the secondary battery 1: it is measured by the voltage detector 11.

(3) A voltage Vc (V) of the capacitor 2: it is measured by the voltage detector 21.

(4) A voltage Vdc (V) on the DC link 8: it is measured by the voltage detector 51.

(5) A SOC (Socb) (%) of the secondary battery 1: it is estimated and calculated by the controller 10, based on a voltage Vb (measurement value) of the secondary battery 1; the controller 10 uses a known voltage table method and refers to a voltage table in the table memory 10*m*.

(6) A SOC (Socc) (%) of the capacitor 2: it is estimated and calculated by the controller 10, based on a voltage Vc (measurement value) of the capacitor 2; the controller 10 uses a known voltage table method and refers to a voltage table in the table memory 10*m*.

It should be noted that in the present embodiment, the controller 10 estimates and calculates SOCs by using the voltage tables, but the present invention is not limited to this. The controller 10 may estimate and calculate the SOCs by using a current integrating method or other methods. Namely, the controller 10 can estimate and calculate the SOCs, based on a voltage of the secondary battery 1 or the capacitor 2 or a current thereof.

Moreover, a control rule of a temperature control process is as follows.

First of all, a control rule of the secondary battery 1 is as follows.

(R1) The controller 10 determines an internal resistance Rb (Ω) of the secondary battery 1 at a temperature Tb (° C.) from the temperature characteristic Rb=func2 (Tb).

(R2) The controller 10 uses the following equation to determine a maximum discharging current Ib_discharge and a maximum charging current Ib_charge from the internal resistance Rb determined from the above (R1).

[Equation 1]

$$V_{b\_Min} = \text{func1}(Soc_{b\_Min}) - R_b \times I_{b\_discharge} \quad (1)$$

[Equation 2]

$$V_{b\_Max} = \text{func1}(Soc_{b\_Max}) + R_b \times I_{b\_charge} \quad (2)$$

(R3) The controller 10 uses the following equation to determine chargeable power Wb_charge (W) and dischargeable power Wb_discharge (W) from the voltage Vb (V) of the secondary battery 1, the number of cells interconnected in series Nb, and the number of cells interconnected in parallel Mb.

[Equation 3]

$$W_{b\_charge} = V_b \times I_{b\_charge} \times N_b \times M_b \quad (3)$$

[Equation 4]

$$W_{b\_discharge} = V_b \times I_{b\_discharge} \times N_b \times M_b \quad (4)$$

Then, a control rule of the capacitor 2 is as follows.

(R11) A capacitance of the capacitor 2 is denoted by C (F); the relationship between a SOC (Socc) and a charge quantity Q of the capacitor is given as follows.

[Equation 5]

$$Soc_c = \frac{Q - C \times V_{c\_Min}}{C \times (V_{c\_Max} - V_{c\_Min})} \quad (5)$$

Therefore, if a charge and discharge range of the capacitor 2 is set to a range from the minimum value Socc_Min of a SOC to the maximum value Socc_Max (%) thereof, the controller 10 can determine a minimum value Q_Min of the charge quantity and a maximum value Q_Max of the charge quantity. Then, the controller 10 determines a maximum discharging current Ic_discharge and a maximum charging current Ic_charge by using the following equation.

[Equation 6]
$$V_{c\_Min} = \frac{Q_{\_Min}}{C} - I_{c\_discharge} \times R_c \quad (6)$$

[Equation 7]
$$V_{c\_Max} = \frac{Q_{\_Max}}{C} + I_{c\_charge} \times R_c \quad (7)$$

(R12) The controller 10 uses the following equations to determine chargeable power Wc_charge (W) and dischargeable power Wc_discharge (W) from a capacitor voltage Vc (V), the number of cells interconnected in series Nc, and the number of cells interconnected in parallel Mc.

[Equation 8]
$$W_{c\_charge} = V_c \times I_{c\_charge} \times N_c \times M_c \quad (8)$$

[Equation 9]
$$W_{c\_discharge} = V_c \times I_{c\_discharge} \times N_c \times M_c \quad (9)$$

Further, control rules of the secondary battery 1 and the capacitor 2 are as follows.

(R21) The power instruction value Pct* is expressed by two values, that is, a capacitor charge instruction value Pct_charge* and a capacitor discharge instruction value Pct_discharge*, which can be determined from the following equations. It should be noted that min (A, B) is a minimum function through which a smaller value of A and B is set to a function value.

[Equation 10]
$$P_{ct\_charge}^* \leftarrow \min(W_{c\_charge}, W_{b\_discharge}) \quad (10)$$

[Equation 11]
$$P_{ct\_discharge}^* \leftarrow \min(W_{c\_discharge}, W_{b\_charge}) \quad (11)$$

(R22) The output power instruction value Pct* is switched over in accordance with the following conditions C1 and C2.
Condition C1:
[Equation 12]
$$SOC_b > SOC_{b\_min} \text{ and } Soc_c < Soc_{c\_Max} \quad (12)$$

An operation under the condition C1:
[Equation 13]
$$P_{ct}^* = P_{ct\_charge}^* \quad (13)$$

Condition C2:
[Equation 14]
$$Soc_b < Soc_{b\_Max} \text{ and } Soc_c > Soc_{c\_Min} \quad (14)$$

An operation under the condition C2:
[Equation 15]
$$P_{ct}^* = P_{ct\_discharge}^* \quad (15)$$

(R23) When determining the output power instruction value Pct* in the above manner, the control function value output unit 42 outputs the output power instruction value Pct* as a temperature control function value. Based on this, the charge and discharge control unit 40 of FIG. 2 calculates a conduction ratio D and sets this conduction ratio D to the DC-DC converter 3, controlling a temperature Tb of the secondary battery 1.

Figure 3A:
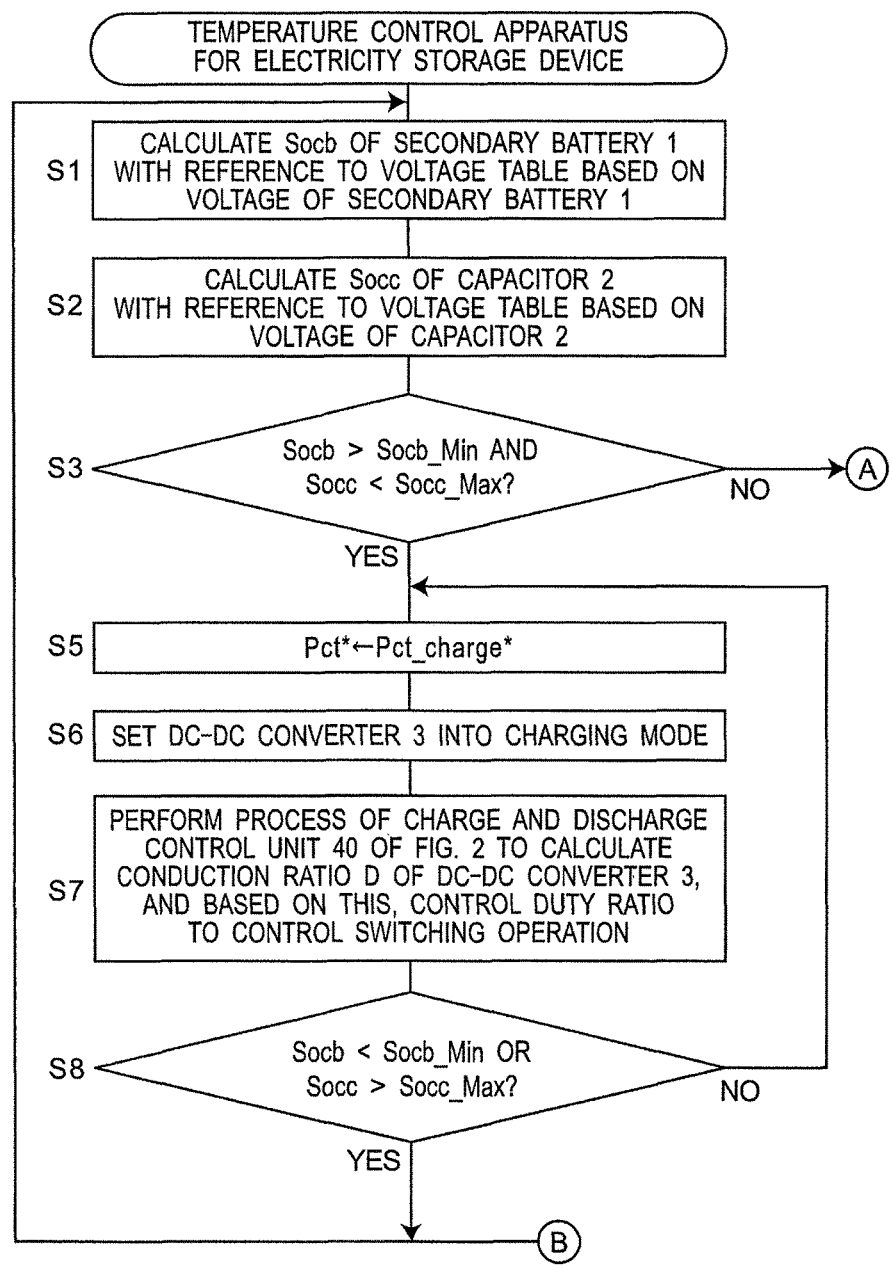
FIG. 3A is a flowchart representing a first part of a process of controlling a temperature of the electricity storage device, the process being performed by the controller 10 of FIG. 1.

FIGS. 3A and 3B are flowcharts each representing a process of controlling a temperature of the electricity storage device, the process being performed by the controller 10 of FIG. 1.

In step S1 of FIG. 3A, the controller 10 calculates a Socb of the secondary battery 1 with reference to a voltage table based on a voltage of the secondary battery 1. In step S2, the controller 10 calculates a Socc of the capacitor 2 with reference to a voltage table based on a voltage of the capacitor 2. Then, in step S3, the controller 10 determines whether or not Socb>Socb_Min and Socc<Socc_Max. If the determination result is NO, the process proceeds to step S4 of FIG. 3B. If the determination result is YES, the process proceeds to step S5. In step S5, the controller 10 sets the capacitor charge instruction value Pct_charge* calculated using Equation 10 as the output power instruction value Pct*. In step S6, the controller 10 sets the DC-DC converter 3 into the charging mode from the capacitor 2 to the secondary battery 1. In step S7, the controller 10 causes the charge and discharge control unit 40 to perform the process of FIG. 2, calculating a duty factor D of the DC-DC converter 3. Based on this, the controller 10 controls the duty ratio, controlling a switching operation. Then, the process proceeds to step S8. In step S8, the controller 10 determines whether Socb<Socb_Min or Socc>Socc_Max. If the determination result is NO, the process returns to step S5, and the DC-DC converter 3 continues to be in the charging mode. If the determination result is YES, the process returns to step S1.

In step S4 of FIG. 3B, the controller 10 determines whether or not Socb<Socb_Max and Socc>Socc_Min. If the determination result is NO, the process proceeds to step S13. If the determination result is YES, the process proceeds to step S9. In step S9, the controller 10 sets the capacitor discharge instruction value Pct_discharge* calculated using Equation 11 as the output power instruction value Pct*. In step S10, the controller 10 sets the DC-DC converter 3 into the discharging mode from the secondary battery 1 to the capacitor 2. In step S11, the controller 10 causes the charge and discharge control unit 40 to perform the process of FIG. 2, calculating a duty factor D of the DC-DC converter 3. Based on this, the controller 10 controls the duty ratio, controlling the switching operation. Then, the process proceeds to step S12. In step S12, the controller 10 determines whether Socb>Socb_Max or Socc<Socc_Min. If the determination result is NO, the process returns to step S9, and the DC-DC converter 3 continues to be in the discharging mode. If the determination result is YES, the process returns to step S1. In step S13, the controller 10 sets the output power instruction value Pct* to 0. In step S14, the controller 10 sets the DC-DC converter 3 into a stop mode. In step S15, the controller 10 sets the duty factor D of the DC-DC converter 3 to 0, and stops the DC-DC converter 3. After the processing in step S15, the process returns to step S1.

Figure 4:
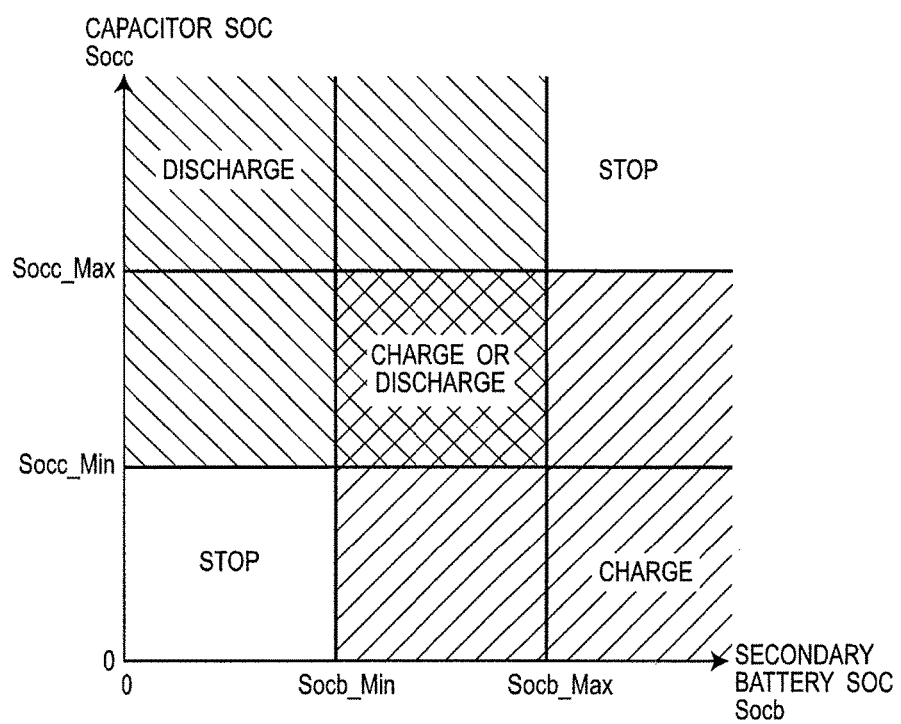
FIG. 4 is a graph of a capacitor SOC (Socc) in relation to a secondary battery SOC (Socb), illustrating regions of a charging mode and a discharging mode in the process of controlling a temperature of the electricity storage device of FIGS. 3A and 3B.

FIG. 4 is a graph of a capacitor SOC (Socc) in relation to a secondary battery SOC (Socb), illustrating regions of the charging mode, the discharging mode, and the stop mode, in the processes of controlling a temperature of the electricity storage device of FIGS. 3A and 3B. As can be seen from FIG. 4, in this control method, the two-dimensional plane of FIG. 4 is separated into four states (charging mode, discharging mode, stop mode, and either one of charging and discharging) by four SOC parameters (Socc_Max, Socc_Min, Socb_Max, and Socb_Min). When Socb>Socb_Max and Socc>Socc_Max, both the electricity storage devices exceed the maximum SOCs, and thus DC-DC converter 3 is set into the stop mode. In addition, when Socb<Socb_Min and Socc>Socc_Min, both the electricity storage devices are less than the minimum SOCs, and thus DC-DC converter 3 is set into the stop mode, too. In the other regions, when Socb>Socb_Min and Socc<Socc_Max, the DC-DC converter 3 is set into the charging mode, and when Socb<Socb_Max and Socc>Socc_Min, the DC-DC converter 3 is set into the discharging mode. In the region where the charging mode overlaps the discharging mode, either one of charging and discharging is allowed, and thus, the DC-DC converter 3 is set into either one of the charging mode and the discharging mode.

Implementation Example

The inventors of the present invention simulated a case of increasing a battery temperature Tb from 22° C. to 23° C. by using the electricity storage system of FIG. 1. FIGS. 5A to 5D and FIGS. 6A to 6D illustrate the results thereof. The conditions of this simulation were set as follows.

(1) The setting range from Socb_Min to Socb_Max (%) of the SOC of the secondary battery 1:40 to 50%;

(2) The setting range from Socc_Min to Socb_Max (%) of the SOC of the capacitor 2:70 to 90%;

(3) The setting range from Vb_Min to Vb_Max (V) of the voltage Vb of the secondary battery 1:2.5 to 3.5 V/cell;

(4) The setting range from Vc_Min to Vc_Max (V) of the voltage Vc of the capacitor 2:2.2 to 3.8 V/cell;

(5) Voltage Vb of secondary battery 1=950.544 V;

(6) The secondary battery 1 was constituted by connecting 288 cells in series to form five series circuits and connecting these series circuits in parallel;

(7) Voltage Vc of capacitor 2=729.6 V;

(8) The capacitor 2 was constituted by connecting 192 cells in series to form five series circuits and connecting these series circuits in parallel;

(9) Capacitor discharge instruction value Pct_discharge*=150 kW;

(10) Capacitor charge instruction value Pct_charge*=400 kW; and

(11) The secondary battery 1 had a heat capacity Cb (1603 J/K/cell) expressed by the following equations.

$$C_B \frac{dT_B}{dt} = I_b^2 \times R_b \quad \text{[Equation 16]}$$

$$R_b = f(T_B) \quad \text{[Equation 17]}$$

Figure 5A:
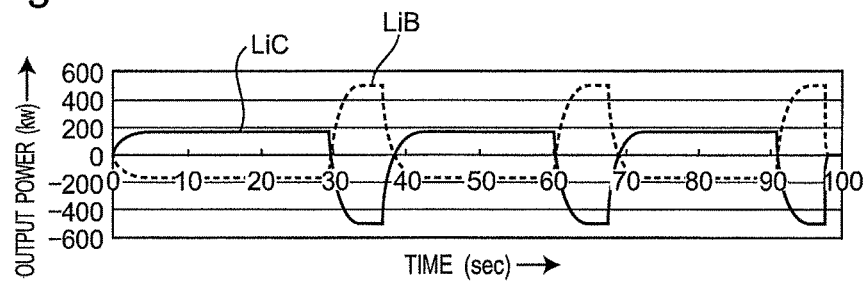
FIG. 5A illustrates a simulation result of the electricity storage system of FIG. 1 and is a waveform chart illustrating output power of each of a lithium ion battery (LiB) and a lithium ion capacitor (LiC) with elapsed time.
Figure 5B:
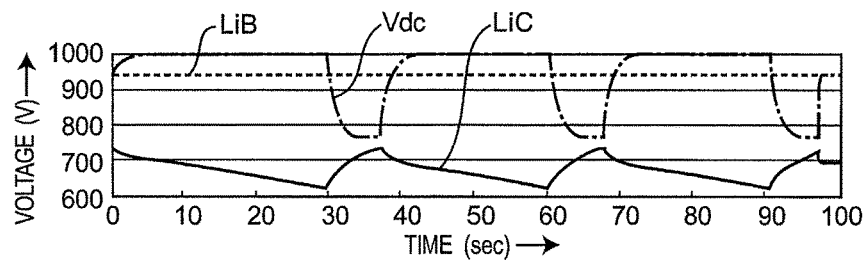
FIG. 5B illustrates a simulation result of the electricity storage system of FIG. 1 and is a waveform chart illustrating a voltage of each of the lithium ion battery (LiB) and the lithium ion capacitor (LiC) and a DC link voltage Vdc with elapsed time.
Figure 5C:
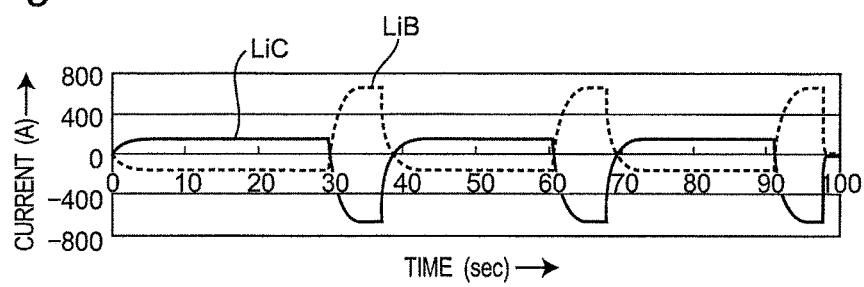
FIG. 5C illustrates a simulation result of the electricity storage system of FIG. 1 and is a waveform chart illustrating a current of each of the lithium ion battery (LiB) and the lithium ion capacitor (LiC) with elapsed time.
Figure 5D:
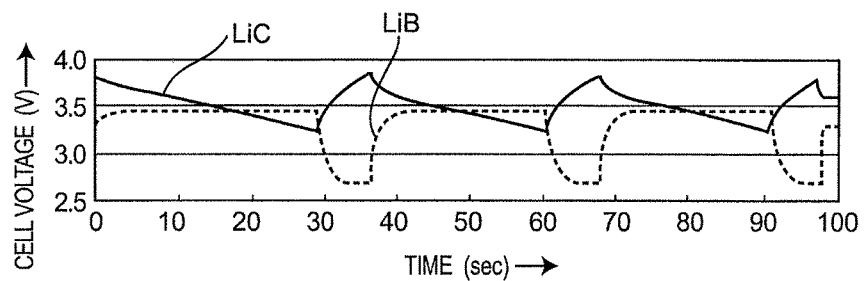
FIG. 5D illustrates a simulation result of the electricity storage system of FIG. 1 and is a waveform chart illustrating a cell voltage of each of the lithium ion battery (LiB) and the lithium ion capacitor (LiC) with elapsed time.
Figure 6A:
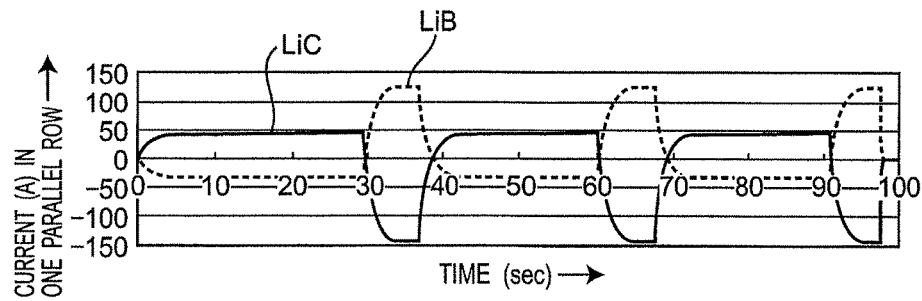
FIG. 6A illustrates a simulation result of the electricity storage system of FIG. 1 and is a waveform chart illustrating a current upon one parallel row in each of the lithium ion battery (LiB) and the lithium ion capacitor (LiC) with elapsed time.
Figure 6B:
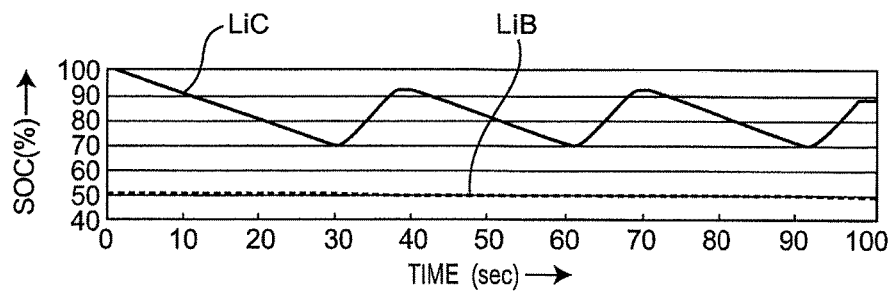
FIG. 6B illustrates a simulation result of the electricity storage system of FIG. 1 and is a waveform chart illustrating a SOC of each of the lithium ion battery (LiB) and the lithium ion capacitor (LiC) with elapsed time.
Figure 6C:
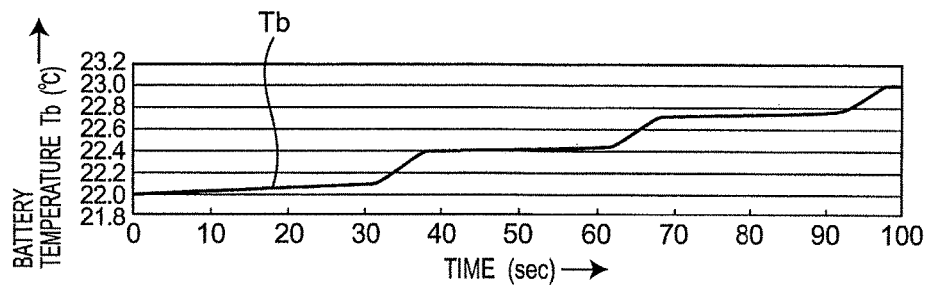
FIG. 6C illustrates a simulation result of the electricity storage system of FIG. 1 and is a waveform chart illustrating a battery temperature Tb of the lithium ion battery (LiB) with elapsed time.
Figure 6D:
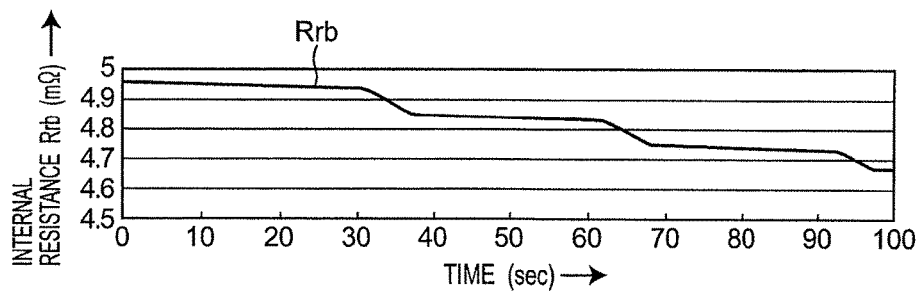
FIG. 6D illustrates a simulation result of the electricity storage system of FIG. 1 and is a waveform chart illustrating an internal resistance Rrb of the lithium ion battery (LiB) with elapsed time.

FIGS. 5A to 5D illustrate simulation results of the electricity storage system of FIG. 1. FIG. 5A is a waveform chart illustrating output power of each of a lithium ion battery (LiB) and a lithium ion capacitor (LiC) with elapsed time. FIG. 5B is a waveform chart illustrating a voltage of each of the lithium ion battery (LiB) and the lithium ion capacitor (LiC) and a DC link voltage Vdc with elapsed time. FIG. 5C is a waveform chart illustrating a current of each of the lithium ion battery (LiB) and the lithium ion capacitor (LiC) with elapsed time. FIG. 5D is a waveform chart illustrating a cell voltage of each of the lithium ion battery (LiB) and the lithium ion capacitor (LiC) with elapsed time. In addition, FIG. 6A to FIG. 6D illustrate simulation results of the electricity storage system of FIG. 1. FIG. 6A is a waveform chart illustrating a current upon one parallel row in each of the lithium ion battery (LiB) and the lithium ion capacitor (LiC) with elapsed time. FIG. 6B is a waveform chart illustrating a SOC of each of the lithium ion battery (LiB) and the lithium ion capacitor (LiC) with elapsed time. FIG. 6C is a waveform chart illustrating a battery temperature Tb of the lithium ion battery (LiB) with elapsed time. FIG. 6D is a waveform chart illustrating an internal resistance Rrb of the lithium ion battery (LiB) with elapsed time.

As can be seen from FIG. 5A to FIG. 5D and FIG. 6A to FIG. 6D, this implementation example enables the battery temperature to increase by 1° C. in about 100 seconds. As can be understood from the above, it is possible to increase the temperature to a preset temperature at a maximum possible rate.

As described above, according to the present embodiment, an electricity storage system using a secondary battery 1 and a capacitor 2 in combination is constituted. This electricity storage system easily increases a temperature of the secondary battery 1 to a preset temperature at a maximum possible rate by controlling charging and discharging between the secondary battery 1 and the capacitor 2. In addition, electricity consumed during the increase in the temperature can be reduced to only charging and discharging efficiencies of the secondary battery and the capacitor.

In the embodiments described above, the secondary battery 1, such as a lithium ion battery, is used as a first electricity storage device, but the present invention is not limited to this. Alternatively, for example, a lead-acid battery, a nickel-cadmium battery, a nickel-hydrogen battery, and a lithium ion polymer battery may be used. In addition, for example, a lithium ion capacitor is used as a second electricity storage device, but the present invention is not limited to this. Alternatively, for example, an electric double-layer capacitor may be used.

In the embodiments described above, the electricity storage system including two electricity storage devices, that is, the secondary battery 1 and the capacitor 2, has been described, but the present invention is not limited to this. An electricity storage system including three or more electricity storage devices may be constituted, and charging and discharging may be performed between the individual electricity storage devices.

INDUSTRIAL APPLICABILITY

As described above in detail, it is possible to provide a temperature control apparatus and method for an electricity storage device which are used for an electricity storage system using a plurality of electricity storage devices in combination, the apparatus and method capable of greatly decreasing power consumption in comparison with the prior art. The AC load 7 is applicable to, for example, AC electrical equipment in an electric propulsion system for an AC motor in a vehicle, a vessel, or the like.

DESCRIPTION OF REFERENCE CHARACTERS

1: secondary battery
2: capacitor
3: bidirectional buck-boost dc-dc converter (dc-dc converter)
4: smoothing reactor
5: filter capacitor
6: dc-ac inverter
7: load
10: controller
10m: table memory
11, 21 and 51: voltage detector
31: current detector
13: temperature measurement instrument
40: charge and discharge control unit
41 and 46: PI controller
42: control function value output unit 43: adder
44: divider
45: subtractor

The invention claimed is:

1. A temperature control apparatus for an electricity storage device for use in an electricity storage system including a plurality of electricity storage devices including a first electricity storage device and a second electricity storage device, the first electricity storage device having a predetermined internal resistance, the temperature control apparatus comprising:
   a bidirectional DC-DC converter provided between the first electricity storage device and the second electricity storage device, so that the first electricity storage device is connected in parallel to the second electricity storage device through the bidirectional DC-DC converter and a DC link;
   a temperature measurement instrument configured to measure a temperature of the first electricity storage device; and
   a controller configured to control the temperature of the first electricity storage device,
   wherein the controller calculates a first SOC of the first electricity storage device, based on a voltage or a current of the first electricity storage device,
   wherein the controller calculates a second SOC of the second electricity storage device, based on a voltage or a current of the second electricity storage device,
   wherein, when the first SOC is larger than a predetermined minimum value of the first SOC and the second SOC is smaller than a predetermined maximum value of the second SOC, the controller sets the bidirectional DC-DC converter into a charging mode from the second electricity storage device to the first electricity storage device and controls the bidirectional DC-DC converter to operate in the charging mode,
   wherein, when the first SOC is smaller than a predetermined maximum value of the first SOC and the second SOC is larger than a predetermined minimum value of the second SOC, the controller sets the bidirectional DC-DC converter into a discharging mode from the first electricity storage device to the second electricity storage device and controls the bidirectional DC-DC converter to operate in the discharging mode, and
   wherein, the controller calculates a conduction ratio D of the bidirectional DC-DC converter, based on the internal resistance of the first electricity storage device, the second SOC and a voltage on the DC link which are obtained when no load is connected to the DC link, and an error in a current of the bidirectional DC-DC converter on a DC link side, and then, the controller controls the bidirectional DC-DC converter so that a conduction ratio of the bidirectional DC-DC converter becomes the conduction ratio D, thereby controlling the temperature of the first electricity storage device by using heat generating from the internal resistance of the first electricity storage device.

2. The temperature control apparatus for the electricity storage device for use in the electricity storage system, as claimed in claim 1,
   wherein the controller calculates a first output power instruction value for the second electricity storage device, based on the internal resistance of the first electricity storage device and the second SOC which are obtained when no load is connected to the DC link, calculates a current instruction value for the bidirectional DC-DC converter on the DC link side, from the first output power instruction value and the voltage on the DC link, and calculates the conduction ratio D of the bidirectional DC-DC converter, based on the error between the current instruction value and the current of the bidirectional DC-DC converter on the DC link side.

3. The temperature control apparatus for the electricity storage device for use in the electricity storage system as claimed in claim 2,
   wherein the controller calculates a second output power instruction value for the second electricity storage device in accordance with a load connected to the DC link, and then, controls the bidirectional DC-DC converter by adding the second output power instruction value to the first output power instruction value.

4. An electricity storage system comprising:
   a temperature control apparatus for the electricity storage device for use in the electricity storage system, and
   a plurality of electricity storage devices including a first electricity storage device and a second electricity storage device,
   wherein the first electricity storage device has a predetermined internal resistance,
   wherein the temperature control apparatus comprises:
   a bidirectional DC-DC converter provided between the first electricity storage device and the second electricity storage device, so that the first electricity storage device is connected in parallel to the second electricity storage device through the bidirectional DC-DC converter and a DC link;
   a temperature measurement instrument configured to measure a temperature of the first electricity storage device; and
   a controller configured to control the temperature of the first electricity storage device,
   wherein the controller calculates a first SOC of the first electricity storage device, based on a voltage or a current of the first electricity storage device,
   wherein the controller calculates a second SOC of the second electricity storage device, based on a voltage or a current of the second electricity storage device,
   wherein, when the first SOC is larger than a predetermined minimum value of the first SOC and the second SOC is smaller than a predetermined maximum value of the second SOC, the controller sets the bidirectional DC-DC converter into a charging mode from the second electricity storage device to the first electricity storage device and controls the bidirectional DC-DC converter to operate in the charging mode,
   wherein, when the first SOC is smaller than a predetermined maximum value of the first SOC and the second SOC is larger than a predetermined minimum value of the second SOC, the controller sets the bidirectional DC-DC converter into a discharging mode from the first electricity storage device to the second electricity storage device and controls the bidirectional DC-DC converter to operate in the discharging mode, and
   wherein, the controller calculates a conduction ratio D of the bidirectional DC-DC converter, based on the internal resistance of the first electricity storage device, the second SOC and a voltage on the DC link which are obtained when no load is connected to the DC link, and an error in a current of the bidirectional DC-DC converter on a DC link side, and then, the controller controls the bidirectional DC-DC converter so that a conduction ratio of the bidirectional DC-DC converter becomes the conduction ratio D, thereby controlling the temperature of the first electricity storage device by using heat generating from the internal resistance of the first electricity storage device.

5. The electricity storage system as claimed in claim 4, further comprising a DC-AC inverter that converts a voltage on the DC link into an AC voltage.

6. A temperature control method for use in an electricity storage system including a plurality of electricity storage devices including a first electricity storage device and a second electricity storage device, the first electricity storage device having a predetermined internal resistance, the method being performed by a temperature control apparatus for the electricity storage devices, wherein the temperature control apparatus comprising:
a bidirectional DC-DC converter provided between the first electricity storage device and the second electricity storage device, so that the first electricity storage device is connected in parallel to the second electricity storage device through the bidirectional DC-DC converter and a DC link;
a temperature measurement instrument configured to measure a temperature of the first electricity storage device; and
a controller configured to control a temperature of the first electricity storage device,
wherein the temperature control method comprising the following steps, being performed by the controller, of:
calculating a first SOC of the first electricity storage device, based on a voltage or a current of the first electricity storage device;
calculating a second SOC of the second electricity storage device, based on a voltage or a current of the second electricity storage device;

when the first SOC is larger than a predetermined minimum value of the first SOC and the second SOC is smaller than a predetermined maximum value of the second SOC, setting the bidirectional DC-DC converter into a charging mode from the second electricity storage device to the first electricity storage device and controlling the bidirectional DC-DC converter to operate in the charging mode, when the first SOC is smaller than a predetermined maximum value of the first SOC and the second SOC is larger than a predetermined minimum value of the second SOC, setting the bidirectional DC-DC converter into a discharging mode from the first electricity storage device to the second electricity storage device and controlling the bidirectional DC-DC converter to operate in the discharging mode; and calculating a conduction ratio D of the bidirectional DC-DC converter, based on the internal resistance of the first electricity storage device, the second SOC, a voltage on the DC link which are obtained when no load is connected to the DC link, and an error in a current of the bidirectional DC-DC converter on a DC link side, and then, controlling the bidirectional DC-DC converter so that a conduction ratio of the bidirectional DC-DC converter becomes the conduction ratio D, thereby controlling the temperature of the first electricity storage device in accordance with a variation in the internal resistance of the first electricity storage device.

* * * * *